(12) United States Patent
Wagner et al.

(10) Patent No.: US 8,961,284 B2
(45) Date of Patent: Feb. 24, 2015

(54) SYSTEM AND METHOD FOR CONTROLLING SPREADER OUTPUT FROM A HARVESTER

(75) Inventors: Bradley J. Wagner, Shippensburg, PA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 335 days.

(21) Appl. No.: 13/618,745

(22) Filed: Sep. 14, 2012

(65) Prior Publication Data

US 2014/0080555 A1 Mar. 20, 2014

(51) Int. Cl.
*A01F 12/30* (2006.01)

(52) U.S. Cl.
USPC .......................................................... 460/112

(58) Field of Classification Search
USPC .......... 460/97, 9, 111, 112, 150; 56/192, 209; 241/243, 186.3, 101.75, 416
See application file for complete search history.

(56) References Cited

U.S. PATENT DOCUMENTS

| | | | |
|---|---|---|---|
| 3,543,491 A * | 12/1970 | Lausch ............................ | 56/192 |
| 3,881,301 A * | 5/1975 | Sawyer et al. .................. | 56/14.4 |
| 4,532,941 A * | 8/1985 | Gauthier ........................ | 460/112 |
| 4,548,214 A * | 10/1985 | Sheehan et al. .................... | 460/9 |
| 4,614,197 A * | 9/1986 | Weber et al. .................. | 460/112 |
| 6,783,454 B2 | 8/2004 | Bueermann | |
| 6,908,379 B2 * | 6/2005 | Gryspeerdt et al. .......... | 460/111 |
| 7,001,269 B2 * | 2/2006 | Weichholdt .................... | 460/112 |
| 7,186,179 B1 | 3/2007 | Anderson et al. | |
| 7,223,168 B2 | 5/2007 | Anderson et al. | |
| 7,390,253 B2 | 6/2008 | Farley et al. | |
| 7,559,833 B2 | 7/2009 | Isaac et al. | |
| 7,993,188 B2 | 8/2011 | Ritter | |
| 2009/0005137 A1 | 1/2009 | Isaac et al. | |
| 2010/0120482 A1 | 5/2010 | Holmém | |
| 2011/0045883 A1 | 2/2011 | Weichholdt et al. | |

FOREIGN PATENT DOCUMENTS

DE 102008048344 3/2010

* cited by examiner

*Primary Examiner* — Robert Pezzuto
(74) *Attorney, Agent, or Firm* — Patrick M. Sheldrake; Seyed V. Sharifi T.

(57) ABSTRACT

A system and method for controlling spreader output from a harvester includes a distribution chamber for receiving an agricultural material removed from a field. The harvester includes a spreader system configured to distribute the agricultural material onto the field, and an opening configured to receive the agricultural material from the distribution chamber. Moreover, the distribution chamber includes a first panel rotatably coupled to a first side of the distribution chamber, and a second panel rotatably coupled to a second side of the distribution chamber. The first and second panels are configured to direct the agricultural material toward the opening of the spreader system. An angle of the first panel is independently adjustable to control a first amount of agricultural material directed toward a first inlet portion. An angle of the second panel is independently adjustable to control a second amount of agricultural material directed toward a second inlet portion.

20 Claims, 4 Drawing Sheets

SYSTEM AND METHOD FOR CONTROLLING SPREADER OUTPUT FROM A HARVESTER

BACKGROUND

The invention relates generally to harvesters, and more specifically, to a system and method for controlling spreader output from a harvester.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a type of harvester generally used to harvest grains (e.g., barley, flax, oats, rye, wheat, etc.). During operation of a combine, the harvesting process may begin by removing a plant from a field, usually using a cutting device. Accordingly, the combine may be used to separate the plant into different agricultural materials, such as grain and material other than grain (MOG).

After separation, the grain is generally directed to a cleaning system, and the MOG is generally directed toward a spreader system, which distributes the MOG across the field. In some combines, the MOG may be chopped before being distributed across the field. Unfortunately, the MOG may be distributed unevenly across the field. For example, one side of the combine may distribute a greater amount of the MOG than the opposite side of the combine. This may be a result of multiple factors, such as, a slope or contour of the field, wind, moisture, and so forth.

BRIEF DESCRIPTION

In one embodiment, a harvester includes a distribution chamber configured to receive an agricultural material removed from a field by the harvester. The harvester also includes a spreader system configured to distribute the agricultural material onto the field. The spreader system includes an opening configured to receive the agricultural material from the distribution chamber. Moreover, the opening comprises a first inlet portion and a second inlet portion. Further, the distribution chamber includes a first panel rotatably coupled to a first side of the distribution chamber, and a second panel rotatably coupled to a second side of the distribution chamber. The first and second panels are configured to direct the agricultural material toward the opening of the spreader system. A first angle of the first panel relative to the first side of the distribution chamber is adjustable to control a first amount of agricultural material directed toward the first inlet portion. A second angle of the second panel relative to the second side of the distribution chamber is adjustable to control a second amount of agricultural material directed toward the second inlet portion. The first and second panels are independently adjustable.

In another embodiment, a harvester includes a chopper configured to receive an agricultural material removed from a field by the harvester and to chop the agricultural material. The harvester also includes a distribution chamber configured to receive the agricultural material from the chopper. The harvester includes a spreader system configured to distribute the agricultural material onto the field. Moreover, the spreader system includes a first spreader having a first inlet portion, and a second spreader having a second inlet portion. The distribution chamber includes a first panel rotatably coupled to a first side of the distribution chamber, and a second panel rotatably coupled to a second side of the distribution chamber. The first panel is configured to direct the agricultural material toward the first inlet portion of the first spreader. A first angle of the first panel relative to the first side of the distribution chamber is adjustable to control a first amount of agricultural material directed toward the first inlet portion. The second panel is configured to direct the agricultural material toward the second inlet of the second spreader. A second angle of the second panel relative to the second side of the distribution chamber is adjustable to control a second amount of agricultural material directed toward the second inlet portion. The first and second panels are independently adjustable.

In a further embodiment, a method for distributing agricultural material removed from a field by a harvester includes detecting a first amount of agricultural material distributed by a first spreader. The method also includes detecting a second amount of agricultural material distributed by a second spreader. The method includes adjusting a first input to the first spreader to control the first amount of agricultural material distributed by the first spreader. The method also includes adjusting a second input to the second spreader to control the second amount of agricultural material distributed by the second spreader. The first input and the second input are independently adjustable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
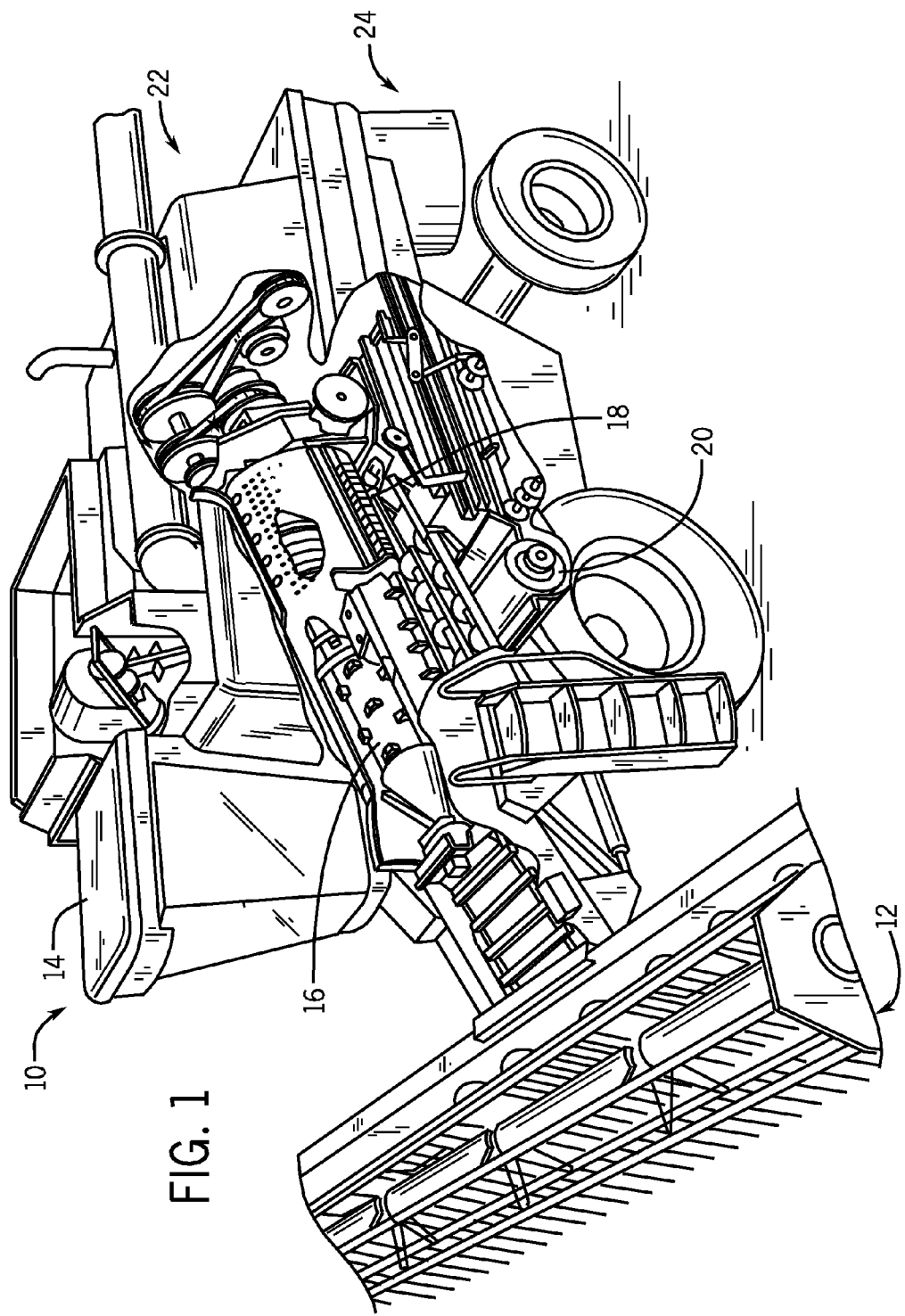
FIG. 1 is a perspective view of an embodiment of a harvester which may be configured to control an amount of material other than grain (MOG) distributed by each spreader of a spreader system.

Turning now to the drawings, FIG. 1 is a perspective view of a harvester 10 (e.g., combine) which may be configured to control an amount of material other than grain (MOG) distributed by each spreader of a spreader system. The harvester 10 may be configured to harvest grains such as barley, flax, oats, rye, wheat, and so forth. Accordingly, the harvester 10 is configured to remove plants from a field, and to separate the plants into grain and MOG. The harvester 10 includes various systems that are used during harvesting.

The harvesting process begins with the harvester 10 using a cutting assembly 12 to remove plants from the field. An operator of the harvester 10 may be seated in a cab 14, and the operator may monitor the operation of the cutting assembly 12 and other systems of the harvester 10. After removing the plants, the harvester 10 transports the plants to a rotor 16. The rotor 16 rotates to separate the grain of the plants from the MOG. Specifically, the rotor 16 has multiple projections on its surface that interact with the plants to facilitate separation of the grain from the MOG. Grain is directed from the rotor 16 toward a cleaning system 18. The cleaning system 18 is configured to further separate the grain from the MOG (e.g., agricultural material such as straw, soil, etc.) using a blower 20. The MOG is directed toward a distribution chamber 22, which provides the MOG to a spreader system 24 for distribution through a field. Moreover, the distribution chamber 22 may include independently adjustable side panels configured to control an amount of material directed to different sides of the spreader system 24 to facilitate even distribution of MOG onto the field. The adjustable side panels may be controlled to compensate for uneven MOG distribution due to various factors, such as wind, moisture, a slope of the field, contours of the field, and so forth.

Figure 2:
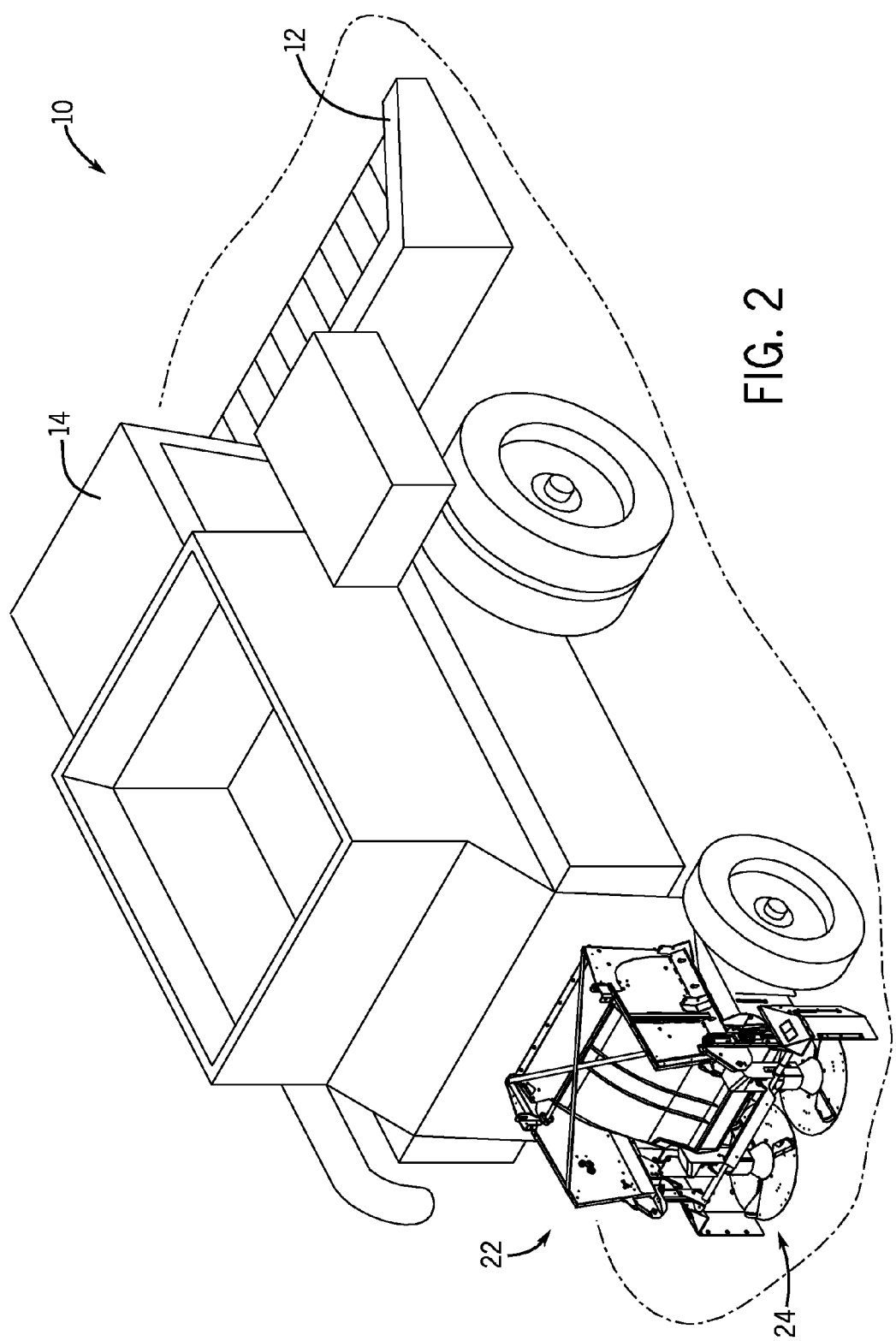
FIG. 2 is another perspective view of an embodiment of a harvester which may be configured to control an amount of MOG distributed by each spreader of a spreader system.

FIG. 2 is another perspective view of an embodiment of the harvester 10 which may be configured to control an amount of MOG distributed by each spreader of the spreader system 24. As illustrated, the distribution chamber 22 and the spreader system 24 are positioned at the rear end of the harvester 10. The spreader system 24 includes spreaders configured to direct the MOG away from the harvester 10, and to distribute the MOG across the field. In certain embodiments, the distribution chamber 22 and the spreader system 24 may be positioned at any suitable location on the harvester 10. As may be appreciated, the distribution chamber 22 and/or the spreader system 24 may be controlled to facilitate even distribution of MOG across the field. The distribution chamber 22 and/or the spreader system 24 may be controlled manually and/or automatically. For example, an operator may manually adjustment the distribution chamber 22 and/or the spreader system 24, such as by rotating a control knob, a fastener, and so forth. As another example, the operator may manually increase and/or decrease an amount of MOG being directed to individual spreaders of the spreader system 24. A control system may be employed to automatically adjust the distribution system 22 and/or the spreader system 24 without operator intervention (e.g., based on uneven distribution of the MOG).

Figure 3:
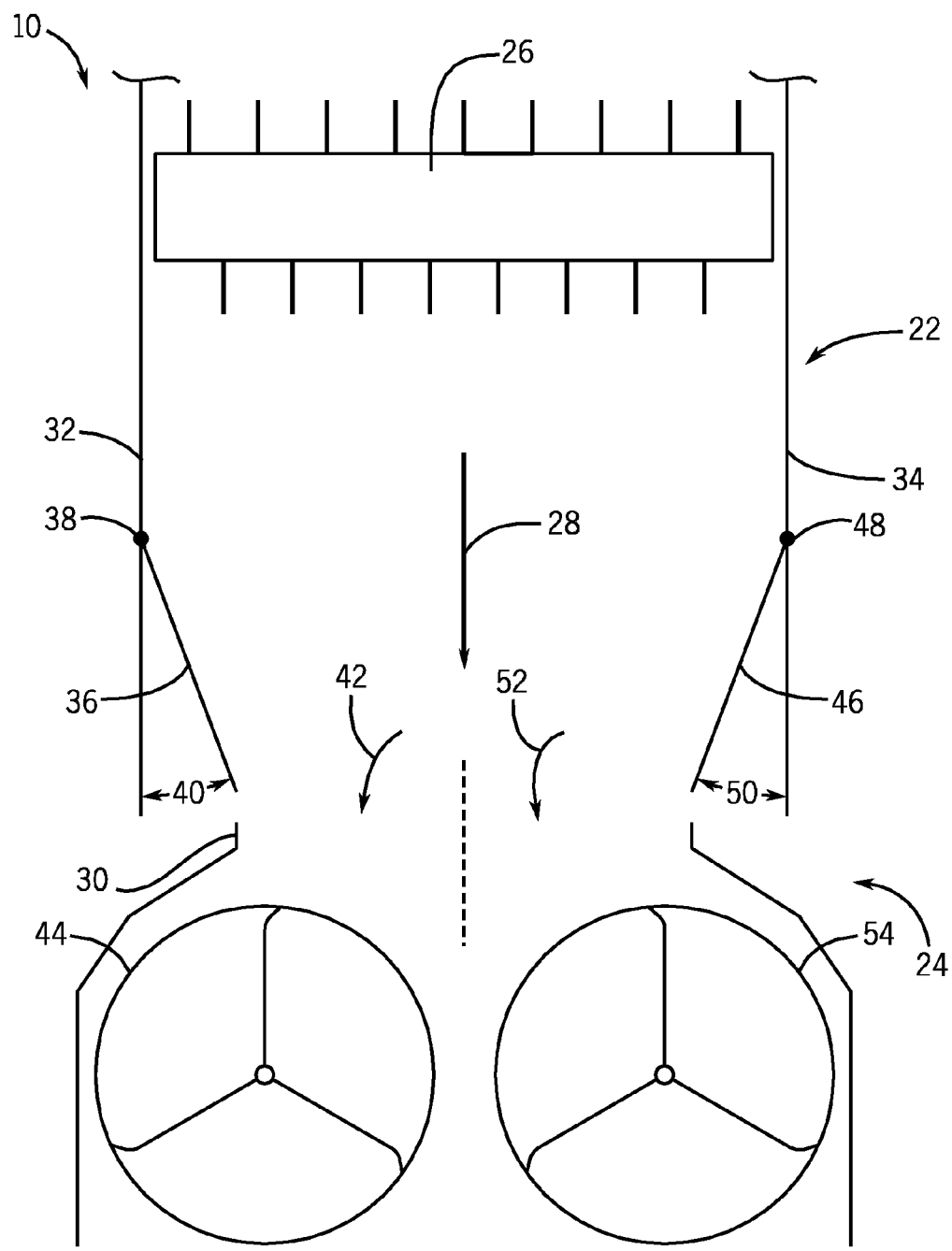
FIG. 3 is a schematic diagram of an embodiment of a harvester having a distribution chamber with adjustable side panels configured to control an amount of MOG provided to each spreader of a spreader system.

FIG. 3 is a schematic diagram of an embodiment of the harvester 10 having the distribution chamber 22 with adjustable side panels configured to control an amount of MOG provided to each spreader of the spreader system 24. After the harvester 10 separates grain from MOG, the MOG is directed toward a chopper 26, which receives MOG that has been removed from the field by the harvester 10. The chopper 26 is configured to chop the MOG to facilitate distribution of smaller pieces of agricultural material across the field. Moreover, the chopper 26 provides the MOG to the distribution chamber 22. Accordingly, the MOG is directed through the distribution chamber 22, as illustrated by arrow 28. The MOG is directed from the distribution chamber 22 toward an opening 30 in the spreader system 24. Thereafter, the spreader system 24 distributes the MOG across the field.

The distribution chamber 22 includes a first side wall 32 and a second side wall 34 positioned opposite the first side wall 32. A first side panel 36 is rotatably coupled to the first side wall 32 via a hinge 38 that facilitates rotation of the first side panel 36 relative to the first side wall 32. Accordingly, the first side panel 36 may be rotated to a desired deflection angle 40 relative to the first side wall 32. The deflection angle 40 may be any suitable angle, such as an angle between a range of approximately 0 degrees to approximately 90 degrees. Adjusting the deflection angle 40 of the first side panel 36 may control an amount of MOG directed toward a first inlet portion 42 of the opening 30. As such, an amount of MOG directed toward a first spreader 44 (e.g., vertical spreader) may be controlled. As may be appreciated, the first spreader 44 may facilitate distribution of MOG from a first side of the spreader system 24. Therefore, controlling the amount of MOG directed toward the first spreader 44 may vary the amount of MOG distributed from the first side of the spreader system 24.

A second side panel 46 is rotatably coupled to the second side wall 34 via a hinge 48 that facilitates rotation of the second side panel 46 relative to the second side wall 34. Accordingly, the second side panel 46 may be rotated to a desired deflection angle 50 relative to the second side wall 34. The deflection angle 50 may be any suitable angle, such as an angle between a range of approximately 0 degrees to approximately 90 degrees. Adjusting the deflection angle 50 of the second side panel 46 may control an amount of MOG directed toward a second inlet portion 52 of the opening 30. As such, an amount of MOG directed toward a second spreader 54 (e.g., vertical spreader) may be controlled. As may be appreciated, the second spreader 54 may facilitate distribution of MOG from a second side of the spreader system 24. Therefore, controlling the amount of MOG directed toward the second spreader 54 may vary the amount of MOG distributed from the second side of the spreader system 24.

The deflection angle 40 of the first side panel 36 may be controlled independently from the deflection angle 50 of the second side panel 46. Moreover, in certain embodiments, a first actuator may be configured to control the deflection angle 40 of the first side panel 36, and a second actuator may be configured to control the deflection angle 50 of the second side panel 46. Further, the deflection angle 40 of the first side panel 36 and the deflection angle 50 of the second side panel 46 may be controlled manually and/or via a control system. For example, in some embodiments, an operator may adjust one or more control knobs of the distribution chamber 22 to change the deflection angles 40 and 50 of the first and second side panels 36 and 46. In other embodiments, a control system may control the deflection angles 40 and 50 of the first and second side panels 36 and 46 based at least partly on sensed data, such as an amount of MOG provided to the first spreader 44, an amount of MOG provided to the second spreader 54, an amount of MOG distributed by the first spreader 44, an amount of MOG distributed by the second spreader 54, a speed of the harvester 10, a turning angle of the harvester 10, a wind speed, a wind direction, a temperature, a moisture content of the MOG, a moisture content in the air, and so forth.

Independent control of the deflection angle 40 of the first side panel 36 and the deflection angle 50 of the second side panel 46 may facilitate a more even distribution of MOG by the spreader system 24. For example, if the first spreader 44 of the spreader system 24 is distributing too much MOG, the deflection angle 40 of the first side panel 36 may be increased, and/or the deflection angle 50 of the second side panel 46 may be decreased to direct a larger amount of MOG toward the second inlet portion 52 of the spreader system 24. Therefore, the amount of MOG distributed by the second spreader 54 may be increased relative to the amount of MOG distributed by the first spreader 44. Conversely, if the second spreader 54 of the spreader system 24 is distributing too much MOG, the deflection angle 40 of the first side panel 36 may be decreased, and/or the deflection angle 50 of the second side panel 46 may be increased to direct a larger amount of MOG toward the first inlet portion 42 of the spreader system 24. Therefore, the amount of MOG distributed by the first spreader 44 may be increased relative to the amount of MOG distributed by the second spreader 54. Thus, by independently changing the deflection angles 40 and 50 of the first and second side panels 36 and 46, MOG may be more evenly distributed by the spreader system 24.

Figure 4:
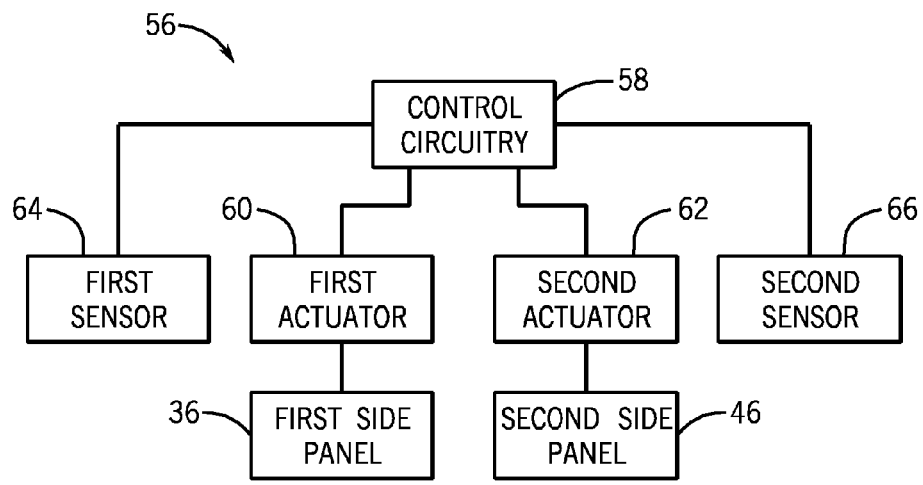
FIG. 4 is a block diagram of an embodiment of a harvester control system for controlling an amount of MOG distributed by each spreader of a spreader system.
Figure 5:
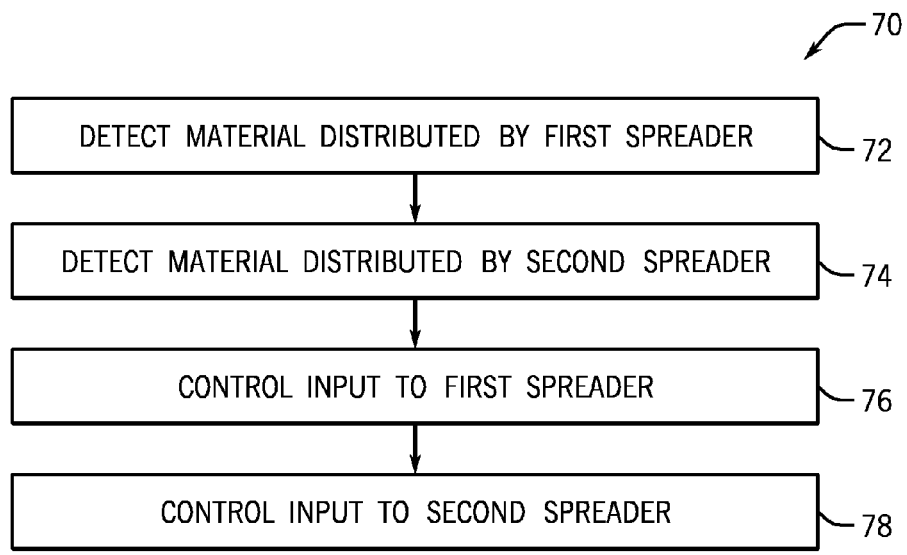
FIG. 5 is a flowchart of an embodiment of a method for distributing agricultural material removed from a field by a harvester.

FIG. 4 is a block diagram of an embodiment of a harvester control system 56 for controlling an amount of MOG distributed by each spreader of the spreader system 24. The control system 56 includes control circuitry 58 configured to control the deflection angles 40 and 50 of the first and second side panels 36 and 46. As may be appreciated, the control circuitry 58 may be configured to manually (e.g., based on operator input) and/or automatically adjust the deflection angles 40 and 50 of the first and second side panels 36 and 46. The control system 56 includes a first actuator 60 configured to control the deflection angle 40 of the first side panel 36, and a second actuator 62 configured to control the deflection angle 50 of the second side panel 46. The first and second actuators 60 and 62 may include any suitable type of actuator. For example, the first and second actuators 60 and 62 may include electric motors, hydraulic cylinders, pneumatic devices, and so forth. Moreover, the first and second actuators 60 and 62 may be electrically, hydraulically, and/or pneumatically controlled.

The control system 56 also includes a first sensor 64 and a second sensor 66. The first and second sensors 64 and 66 are configured to detect a suitable parameter for controlling the deflection angles 40 and 50 of the first and second side panels 36 and 46. For example, the first sensor 64 may be configured to detect an amount of MOG distributed by the first spreader 44, and the second sensor 66 may be configured to detect an amount of MOG distributed by the second spreader 54. For example, the first and second sensors 64 and 66 may be electrical sensors, optical sensors, mechanical sensors, and so forth. Moreover, the first and second sensors 64 and 66 may be configured to detect operating conditions of the harvester 10, such as a slope of the field, contours of the field, a wind speed, a position of the harvester 10, an orientation of the harvester 10, a moisture in the air, a moisture level of the MOG, an amount of MOG provided to the first and/or second inlet portions, an amount of MOG distributed by the first and second spreaders 44 and 54, and so forth. The control circuitry 58 is configured to receive data from the sensors 64 and 66. The control circuitry 58 controls the deflection angles 40 and 50 of the first and second side panels 36 and 46 based on the data from the sensors. Accordingly, the control system 56 may facilitate an even distribution of MOG by the spreader system 24.

FIG. 5 is a flowchart of an embodiment of a method 70 for distributing agricultural material (e.g., MOG) removed from the field by the harvester 10. As discussed above, a first amount of agricultural material distributed by the first spreader 44 is detected, such as via the first sensor 64 (block 72). Moreover, a second amount of agricultural material distributed by the second spreader 54 is detected, such as via the second sensor 66 (block 74). A first input to the first spreader 44 may be adjusted to control the first amount of agricultural material distributed by the first spreader 44 (block 76). For example, the first input may be adjusted by controlling the deflection angle 40 of the first side panel 36 and/or by controlling the deflection angle 50 of the second side panel 46. The second input to the second spreader 54 may be adjusted to control the second amount of agricultural material distributed by the second spreader 54 (block 78). For example, the second input may be adjusted by controlling the deflection angle 40 of the first side panel 36 and/or by controlling the deflection angle 50 of the second side panel 46. As discussed above, the first input and the second input are independently adjustable.

Using the systems and methods described herein, the harvester 10 may be able to more evenly distribute MOG across a field using the spreader system 24. For example, if an operator detects that MOG is being distributed unevenly, the operator may adjust the deflection angles 40 and 50 of the first and second side panels 36 and 46 to facilitate a more even distribution of MOG. Accordingly, the amount of MOG distributed by individual spreaders 44 and 54 of the spreader system 24 may be controlled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A harvester comprising:

a distribution chamber configured to receive an agricultural material removed from a field by the harvester; and a spreader system configured to distribute the agricultural material onto the field, wherein the spreader system comprises an opening configured to receive the agricultural material from the distribution chamber, and the opening comprises a first inlet portion and a second inlet portion;

wherein the distribution chamber comprises a first panel rotatably coupled to a first side of the distribution chamber, and a second panel rotatably coupled to a second side of the distribution chamber, the first and second panels are configured to direct the agricultural material toward the opening of the spreader system, a first angle of the first panel relative to the first side of the distribution chamber is adjustable to control a first amount of agricultural material directed toward the first inlet portion, a second angle of the second panel relative to the second side of the distribution chamber is adjustable to control a second amount of agricultural material directed toward the second inlet portion, and the first and second panels are independently adjustable.

2. The harvester of claim 1, wherein the agricultural material comprises a material other than grain (MOG).

3. The harvester of claim 1, wherein the spreader system comprises a first spreader and a second spreader.

4. The harvester of claim 3, wherein the first inlet portion is configured to direct agricultural material toward the first spreader, and the second inlet portion is configured to direct agricultural material toward the second spreader.

5. The harvester of claim 1, wherein the first and second panels are configured to be manually adjusted.

6. The harvester of claim 1, comprising a first actuator coupled to the first panel and configured to adjust the first angle, and a second actuator coupled to the second panel and configured to adjust the second angle.

7. The harvester of claim 6, wherein the first actuator comprises a first electric motor, and the second actuator comprises a second electric motor.

8. The harvester of claim 6, wherein the first and second actuators are configured to be controlled hydraulically or pneumatically.

9. The harvester of claim 1, wherein the first and second panels are configured to be adjusted by a control system.

10. The harvester of claim 9, wherein the first and second panels are configured to be adjusted based at least partly on a slope of the field.

11. The harvester of claim 1, wherein the spreader system comprises a vertical spreader.

12. The harvester of claim 1, comprising a chopper configured to chop the agricultural material, and to provide the chopped agricultural material to the distribution chamber.

13. A harvester comprising:
- a chopper configured to receive an agricultural material removed from a field by the harvester, and to chop the agricultural material;
- a distribution chamber configured to receive the agricultural material from the chopper; and
- a spreader system configured to distribute the agricultural material onto the field, wherein the spreader system comprises a first spreader having a first inlet portion, and a second spreader having a second inlet portion;
- wherein the distribution chamber comprises a first panel rotatably coupled to a first side of the distribution chamber, and a second panel rotatably coupled to a second side of the distribution chamber, the first panel is configured to direct the agricultural material toward the first inlet portion of the first spreader, a first angle of the first panel relative to the first side of the distribution chamber is adjustable to control a first amount of agricultural material directed toward the first inlet portion, the second panel is configured to direct the agricultural material toward the second inlet of the second spreader, a second angle of the second panel relative to the second side of the distribution chamber is adjustable to control a second amount of agricultural material directed toward the second inlet portion, and the first and second panels are independently adjustable.

14. The harvester of claim 13, comprising a first actuator coupled to the first panel and configured to adjust the first angle, and a second actuator coupled to the second panel and configured to adjust the second angle.

15. The harvester of claim 13, wherein the first and second panels are configured to be manually adjusted.

16. A method for distributing agricultural material removed from a field by a harvester, comprising:
- detecting a first amount of agricultural material distributed by a first spreader;
- detecting a second amount of agricultural material distributed by a second spreader;
- adjusting a first input to the first spreader to control the first amount of agricultural material distributed by the first spreader; and
- adjusting a second input to the second spreader to control the second amount of agricultural material distributed by the second spreader, wherein the first input and the second input are independently adjustable.

17. The method of claim 16, wherein adjusting the first input to the first spreader comprises adjusting a first deflection angle of a first panel configured to direct agricultural material toward the first spreader, and adjusting the second input to the second spreader comprises adjusting a second deflection angle of a second panel configured to direct agricultural material toward the second spreader.

18. The method of claim 17, wherein adjusting the deflection angle of the panel comprises controlling an actuator coupled to the panel.

19. The method of claim 18, wherein the actuator is controlled manually.

20. The method of claim 18, wherein the actuator is controlled by a control system.

* * * * *